UNITED STATES PATENT OFFICE.

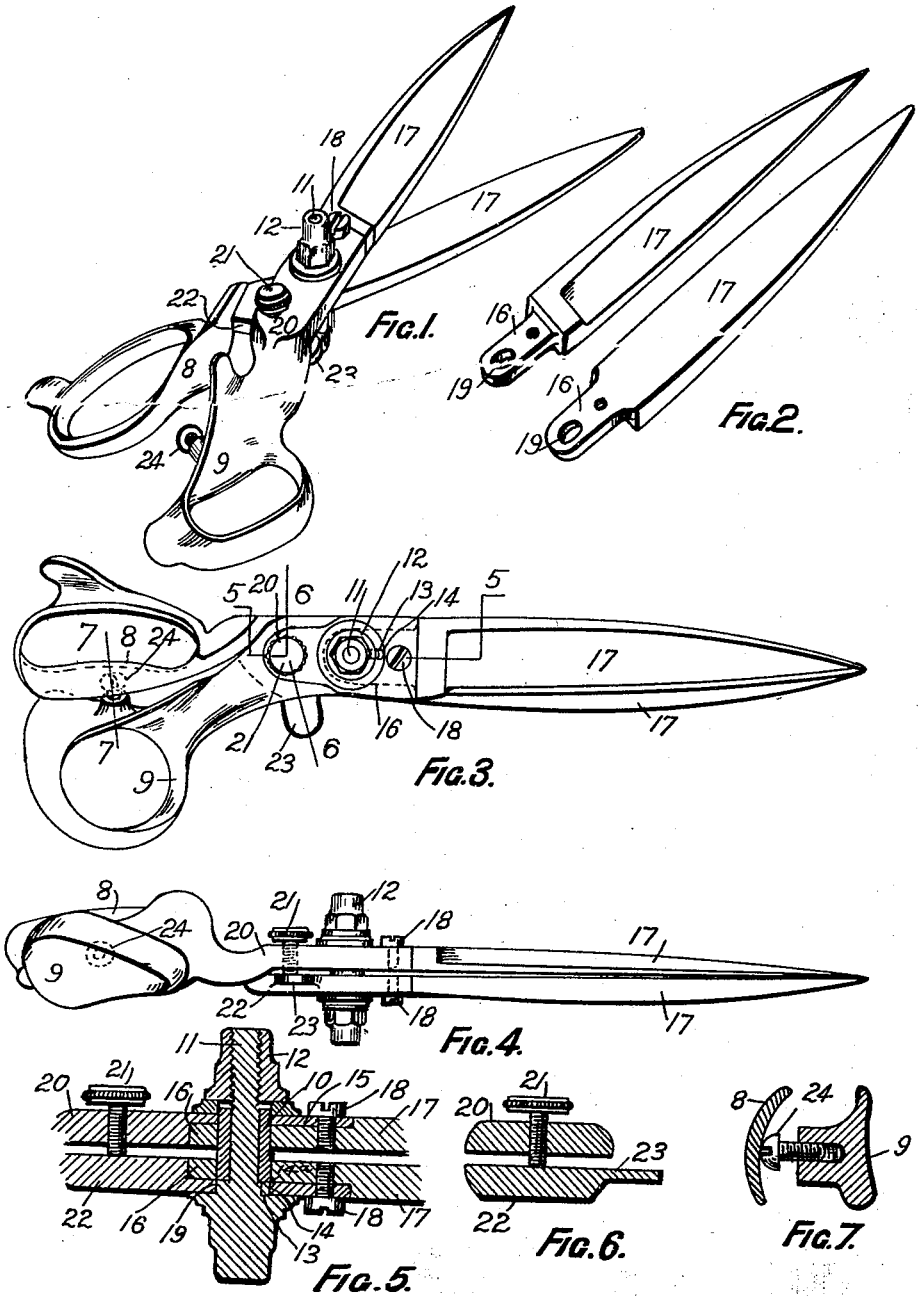

SAMUEL THOMAS SHIRT, OF SYDNEY, NEW SOUTH WALES, AUSTRALIA.

HAND-SHEARS.

1,005,661. Specification of Letters Patent. Patented Oct. 10, 1911.

Application filed June 3, 1909. Serial No. 499,962.

*To all whom it may concern:*

Be it known that I, SAMUEL THOMAS SHIRT, a subject of the King of Great Britain, residing at 586ᴀ George street, Sydney, in the State of New South Wales, Commonwealth of Australia, have invented certain new and useful Improvements in Hand-Shears, of which the following is a specification.

This invention relates to improvements in hand shears or scissors having detachable blades and is especially applicable to what is known as tailor's cutting out shears.

The object of my invention is to provide shears with cutting blades which can be more quickly detached from the shanks or handles and a duplicate pair fitted thereon and more readily adjusted than those heretofore in use.

According to the invention as applied to cutting out shears the shanks or handles are pivoted on a bearing through which passes a tension bolt capable of being tightened up by a suitable nut. Adjacent to the bearing the shanks each have a recess which takes the end of the detachable cutting blades which are partly held in same by means of screws studs or the like.

The rising parts of the shears are preferably provided with a tension screw in order that the relation of the cutting edges of the blades may be quickly adjusted. I also prefer to have a screw on one of the finger loops the said screw to act against the other finger loop, its purpose being to quickly adjust the points of the blades. But in order that my invention may be easily comprehended, I refer now to the drawings herewith, in which:—

Figure 1 is a perspective view illustrating my improvements. Fig. 2 is a perspective view of the blades detached. Fig. 3 is a plan view of the shears, Fig. 4 is an elevation thereof. Figs. 5, 6, and 7 are respectively detail sections on an enlarged scale through the lines 5—5, 6—6, and 7—7 Fig. 3.

The same numerals indicate like parts.

8 and 9 are the shanks or handles of the shears being pivoted on the bearing 10 through which passes the bolt 11 capable of being tightened up by the nut 12. The bolt head is keyed to the shank on the same side by means of a projection or feather 13 engaging in a corresponding recess 14 in the shank, the said recess being located in a step 14ᵃ upon which the bearing 10 rests.

15 are recesses in the shanks for the extensions 16 of the blades 17 which are secured in same by means of the screws 18. These extensions 16 have holes 19 therethrough which permit them to pass on to the bearing 10.

Through the rising part 20 of one of the shanks is fitted a thumb screw 21 which bears against the rising part 22 of the opposite shank and preferably also against an extension or guide 23 which I may use in some cases. By means of the screw 21 the cutting edges of the blades may be quickly adjusted. 24 is another adjusting screw on one of the finger loops which screw acts against the opposite finger loop and facilitates adjustment of the blade points.

Having thus described my invention, what I claim as new, and desire to secure by Letters Patent is:—

In hand shears, the combination, with a pair of handles, of a smooth-surfaced cylindrical sleeve arranged as a pivot bearing therefor, a bolt having a step which fits within one of the handles and is keyed thereto and upon which the sleeve rests, the shank of the bolt passing through the sleeve and having a nut on its projecting end, the handles having recesses and blades having end portions removably fitted in the recesses, the said end portions having openings to surround the bearing.

In testimony whereof I have hereunto set my hand in presence of two subscribing witnesses.

SAMUEL THOMAS SHIRT.

Witnesses:
CHARLES E. GRAHAM,
HENRY WATCHORNE CLARKE.

---

Copies of this patent may be obtained for five cents each, by addressing the "Commissioner of Patents, Washington, D. C."